(12) United States Patent
Pal et al.

(10) Patent No.: US 10,248,699 B2
(45) Date of Patent: Apr. 2, 2019

(54) QUESTION ROUTING FOR USER COMMUNITIES

(71) Applicant: International Business Machines Corporation, Armonk, NY (US)

(72) Inventors: Aditya Pal, San Jose, CA (US); Fei Wang, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 35 days.

(21) Appl. No.: 15/293,085

(22) Filed: Oct. 13, 2016

(65) Prior Publication Data

US 2017/0031923 A1 Feb. 2, 2017

Related U.S. Application Data

(63) Continuation of application No. 14/032,264, filed on Sep. 20, 2013, now Pat. No. 9,508,104.

(51) Int. Cl.
*G06F 17/30* (2006.01)
*G06Q 50/00* (2012.01)
(Continued)

(52) U.S. Cl.
CPC ......... *G06F 17/3053* (2013.01); *G06Q 50/01* (2013.01); *H04L 67/02* (2013.01); *H04L 67/306* (2013.01); *H04L 67/42* (2013.01)

(58) Field of Classification Search
CPC ......... G06F 17/30867; G06F 17/30386; G06F 17/3053; G06F 17/30864; G06F 17/30861
USPC ........ 707/E17.014, 723, 769, 709, 748, 749, 707/999.003, 999.005, E17.008, 706, 724, 707/725, 732, 741, 758, 999.007, 707/E17.002, E17.005, E17.01, E17.032, 707/E17.033, E17.046, E17.099, E17.109, 707/728, 731, 737, 738, 754, 771, 772, 707/780, 794, 999.001, 999.004, 999.1; 706/12, 45, 46, 52; 709/204, 206, 217,
(Continued)

(56) References Cited

U.S. PATENT DOCUMENTS 6,938,068 B1 8/2005 Kraft et al.
8,346,701 B2 1/2013 Wang et al.
(Continued)

OTHER PUBLICATIONS

Adamic et al., "Knowledge Sharing and Yahoo Answers: Everyone Knows Something," WWW 2008 / Refereed Track: Social Networks & Web 2.0—Analysis of Social Networks & Online Interaction, pp. 665-674, ACM New York, NY, USA © 2008. DOI: 10.1145/1367497.1367587.

(Continued)

*Primary Examiner* — Jay A Morrison
*Assistant Examiner* — Ken Hoang
(74) *Attorney, Agent, or Firm* — Kelsey M. Skodje (57) ABSTRACT

A computer-implemented method routes a current question to one or more of a plurality of online communities. A computer system can determine, for the current question presented by an asking user a plurality of question-to-question similarity values, a plurality of question-to-user similarity values and a plurality of question-to-community similarity values. The system can select one or more of the plurality of online communities based on the similarity values. The system can route the current question presented by the asking user to the selected one or more of the plurality of online communities.

17 Claims, 4 Drawing Sheets

(51) Int. Cl.
*H04L 29/06* (2006.01)
*H04L 29/08* (2006.01)

(58) Field of Classification Search
USPC .............. 709/224, 218, 219, 223, 225, 226;
705/319, 304, 14.42, 14.71, 1.1, 3, 35,
705/37, 7.11, 7.14, 7.32, 14.12, 14.31,
705/14.41, 14.49, 14.53, 14.54, 14.73,
705/26.1, 26.61, 26.64, 26.7, 314, 347,
705/40, 412, 7.13, 7.29, 7.38
See application file for complete search history.

(56) References Cited

U.S. PATENT DOCUMENTS

| | | | |
|---|---|---|---|
| 8,417,581 | B2 | 4/2013 | Ajjarapu et al. |
| 8,935,192 | B1 | 1/2015 | Ventilla et al. |
| 2003/0028525 | A1 | 2/2003 | Santos et al. |
| 2007/0067288 | A1* | 3/2007 | Chung .............. G06F 17/30979 |
| 2008/0046520 | A1 | 2/2008 | Jager et al. |
| 2009/0162824 | A1 | 6/2009 | Heck |
| 2010/0070448 | A1 | 3/2010 | Omoigui |
| 2010/0100546 | A1 | 4/2010 | Kohler |
| 2012/0095978 | A1 | 4/2012 | Levin et al. |
| 2012/0272164 | A1 | 10/2012 | Polonsky et al. |
| 2012/0296967 | A1 | 11/2012 | Tao et al. |
| 2012/0317102 | A1 | 12/2012 | Hu et al. |
| 2013/0013546 | A1 | 1/2013 | Bagchi et al. |
| 2015/0088906 | A1 | 3/2015 | Pal et al. |

OTHER PUBLICATIONS

Balog et al., "Formal Models for Expert Finding in Enterprise Corpora," SIGIR'06, Aug. 6-11, 2006, Seattle, Washington, USA. pp. 43-45. ACM New York, NY, USA © 2006. DOI: 101145/1148170.1148181.

Cao et al., "Recommending Questions Using the Mdl-Based Tree Cut Model," WWW 2008 / Refereed Track: Data Mining—Learning, pp. 81-90, Copyright International World Wide Web Conference Committee (IW3C2), ACM New York, NY, USA © 2008. DOI: 10.1145/1367497.1367509.

D'Amore, et al., "Expertise Community Detection," SIGIR'04, Jul. 25-29, 2004, Sheffield, South Yorkshire, UK, pp. 498-499, ACM New York, NY, USA © 2004. DOI: 101145/1008992.1009089.

Li, et al. "Question Routing in Community Question Answering: Puffing Category in Its Place," Proceedings of the 20th ACM international conference on Information and knowledge management, pp. 2041-2044, ACM New York, NY, USA © 2011. DOI: 10.1145/2063576.2063885.

Li, et al., "G-finder: Routing Programming Questions Closer to the Experts," OOPSLA/SPLASH'10, Oct. 17-21, 2010, Reno/Tahoe, Nevada, USA, pp. 62-73, ACM New York, NY, USA © 2010. DOI: 10.1145/1932682.1869466.

Suryanto et al., "Quality-Aware Collaborative Question Answering: Methods and Evaluation," WSDM '09, pp. 142-151, ACM New York, NY, USA © 2009. DOI: 10.1145/1498759.1498820.

Zhou et al., "Routing Questions to the Right Users in Online Communities," ICDE '09. IEEE 25th International Conference on Data Engineering, 2009, pp. 700-711. DOI: 10.1109/ICDE.2009.44.

Davoodi et al., "A semantic social network-based expert recommender system," Applied Intelligence, Jul. 2013, vol. 9, Issue 1, pp. 1-13, (Published online: Oct. 12, 2012), © Springer Science+Business Media, LLC, 2012. DOI: 10.1007/s10489-012-0389-1.

\* cited by examiner

QUESTION ROUTING FOR USER COMMUNITIES

BACKGROUND

This disclosure relates to managing communities for sharing knowledge and expertise. In particular, it relates to matching a user provided question with one or more communities.

Online community can include a group of users who share a common interest, background, or experience. These users may share a collective goal of contributing towards the welfare of the community members. Question answering within the community can be an important feature that enables community members to exchange knowledge within the community boundary. The sheer number of communities can complicate efforts to route questions to an appropriately focused community in order to get a quality resolution or answer in a reasonable time frame.

SUMMARY

Consistent with certain embodiments, a system or computer-implemented method is provided for routing a current question, presented by an asking user, to one or more of a plurality of online communities that each has a plurality of users and a plurality of answers to a plurality of existing questions. The embodiments contemplate determining, for the current question presented by the asking user and the plurality of existing questions within the plurality of online communities, a plurality of question-to-question similarity values; determining, for the current question presented by the asking user and of the plurality of users contributing answers to questions, a plurality of question-to-user similarity values; and determining, for the current question presented by the asking user and the plurality of online communities, a plurality of question-to-community similarity values. The embodiments can also include selecting one or more of the plurality of online communities based on the plurality of question-to-question similarity values, the plurality of question-to-user similarity values, and the plurality of question-to-community similarity values, and then routing the current question presented by the asking user to the selected one or more of the plurality of online communities.

Certain embodiments are directed toward a computer-implemented method for routing a current question, presented by an asking user, to one or more of a plurality of online communities that each has a plurality of users and a plurality of answers to a plurality of existing questions. The method includes determining, for the current question presented by the asking user and the plurality of existing questions within the plurality of online communities, a plurality of similarity values for each of the plurality of online communities. The plurality of similarity values can be ranked and, based on the ranking, a subset of similarity values can be selected from the plurality of similarity values. The online communities of the plurality of online communities are scored based on the number of similarity values in the subset that correspond to a particular online community being scored. One or more of the plurality of online communities are selected based on the scoring, and the current question presented by the asking user is routed to the selected one or more of the plurality of online communities.

Embodiments are directed toward a computer program product for routing questions. The computer program product can comprise a computer readable storage medium having program code embodied therewith, the program code readable/executable by a computer to determine, using the computer and for a current question presented by an asking user and for a plurality of existing questions within a plurality of online communities that each has a plurality of users contributing answers to the plurality of existing questions, a plurality of question-to-question similarity values; determine, using the computer and for the current question presented by the asking user and of the plurality of users contributing answers, a plurality of question-to-user similarity values; determine, using the computer and for the current question presented by the asking user and the plurality of online communities, a plurality of question-to-community similarity values; select, using the computer, one or more of the plurality of online communities based on the plurality of question-to-question similarity values, the plurality of question-to-user similarity values and plurality of question-to-community similarity values; and route, using the computer, the current question presented by the asking user to the selected one or more of the plurality of online communities.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments of the invention and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to question routing to online communities, more particular aspects relate to identifying matches between questions and online communities. While the present invention is not necessarily limited to such applications, various aspects of the invention may be appreciated through a discussion of various examples using this context.

In certain embodiments of the disclosure, questions are routed to an online community based upon one or more algorithms that select a set of communities for a particular question. The algorithm can model communities based upon properties of individual community users and/or for additional features, such as language attributes and an inclination to respond. Consistent with certain embodiments, one or more k nearest neighbor based algorithms can be used to compute community scores from the various features. These community scores can be combined to build a recommended list of one or more communities for a question. Consistent with certain embodiments, clustering methods can be used for providing an efficient mechanism to generate a recommendation.

Embodiments of the present disclosure are directed toward a computer system and/or method for intelligently routing questions to one or more online communities (or just "communities"). For instance, a computer system can be configured to identify potential online communities based upon metrics, such as language analysis of questions, and inclination to respond to model community characteristics like community norms. The metrics can be used to generate a plurality of community scores, which are used to generate a ranked list of communities. Particular aspects are configured to run in (near) real time and for large-scale community data sets.

An online community can include a group of users who interact with one another through computer network (Internet) technologies. As an example, various websites provide a dedicated online community portal that allows users to join communities, create new communities, and post questions and discussions within the communities. Similarly, many enterprises host an internal community platform that aides in knowledge sharing through community users posting questioning and also answering the posted questions. Question answering within communities can facilitate free information flow and encourage collaboration within an enterprise.

As the number of communities increases, the ability to find a proper community for a particular question becomes more difficult. If the burden of selecting a community falls upon the user asking the question, the question may not get sent to the proper community or the user may get frustrated and otherwise discouraged from using the online communities. Embodiments of the present disclosure are directed toward a question routing strategy that facilitates routing a new question to an appropriately focused community in a reasonable time frame. This can be particularly useful for alleviating the burden of finding the right community from the question asker. For instance, on a medical website there might be more than 15 communities on parenting alone. These communities could range from "cloth diaper" to "parenting: 2-year-olds" to "autism support group." For a question asker that is unfamiliar with the different communities, it may require a considerable effort to sift through the volumes of the data within these communities in order to identify a relevant community in which to ask their question.

Some question routing can include identification of the best users (answerers) for a particular question. More particular aspects of the present disclosure are directed toward the use of community-based metrics to identifying one or more communities to provide an answer. Question routing that is tailored toward identifying a matching community of many individuals can be particularly useful for increases the likelihood of the question being answered because a community is a collection of people and hence the chances of more eyes looking at the question are higher (e.g., as opposed to routing a question based on a match to a particular individual). For instance, routing a question to a community instead of an individual can help mitigate issues resulting from too many questions being routed to a particularly knowledgeable user. Various embodiments are based upon the recognition that the collective knowledge of the community or the wisdom of the crowd can supersede that of a particular individual.

Certain embodiments are directed toward a system or method that takes into account the recognition that often a community can include a large number of knowledge seekers (question askers) and only a small number of knowledge creators (question answerers). For instance, embodiments are directed toward aggregating community factors in order to model community behavior. For instance, this modeling can be designed to capture community norms and practices. As a non-limiting example, let x and y be members of a first community. Additionally, x is a member of a second community. If a question comes in which only x and y can answer, then a greedy strategy may dictate routing it to the first community. However, that question might not be acceptable to other members of the first community. It could be tagged as spam or otherwise discounted so that neither x or y provide an answer.

Consistent with embodiments, one or more k nearest neighbor type algorithms can be used to aggregate a variety of different community-based metrics. A few non-limiting community metrics include language analysis of questions and inclination to respond to model community characteristics like community norms and thereby generate community scores. Various embodiments are directed toward different models that combine community scores to produce a ranked list of communities over two large real world datasets. Consistent with particular embodiments, a data set of community information can be partitioned into separate clusters of communities. This clustering can be particularly useful for improving the response time between the submission of a question and the identification of one or more suitable communities.

Figure 1:
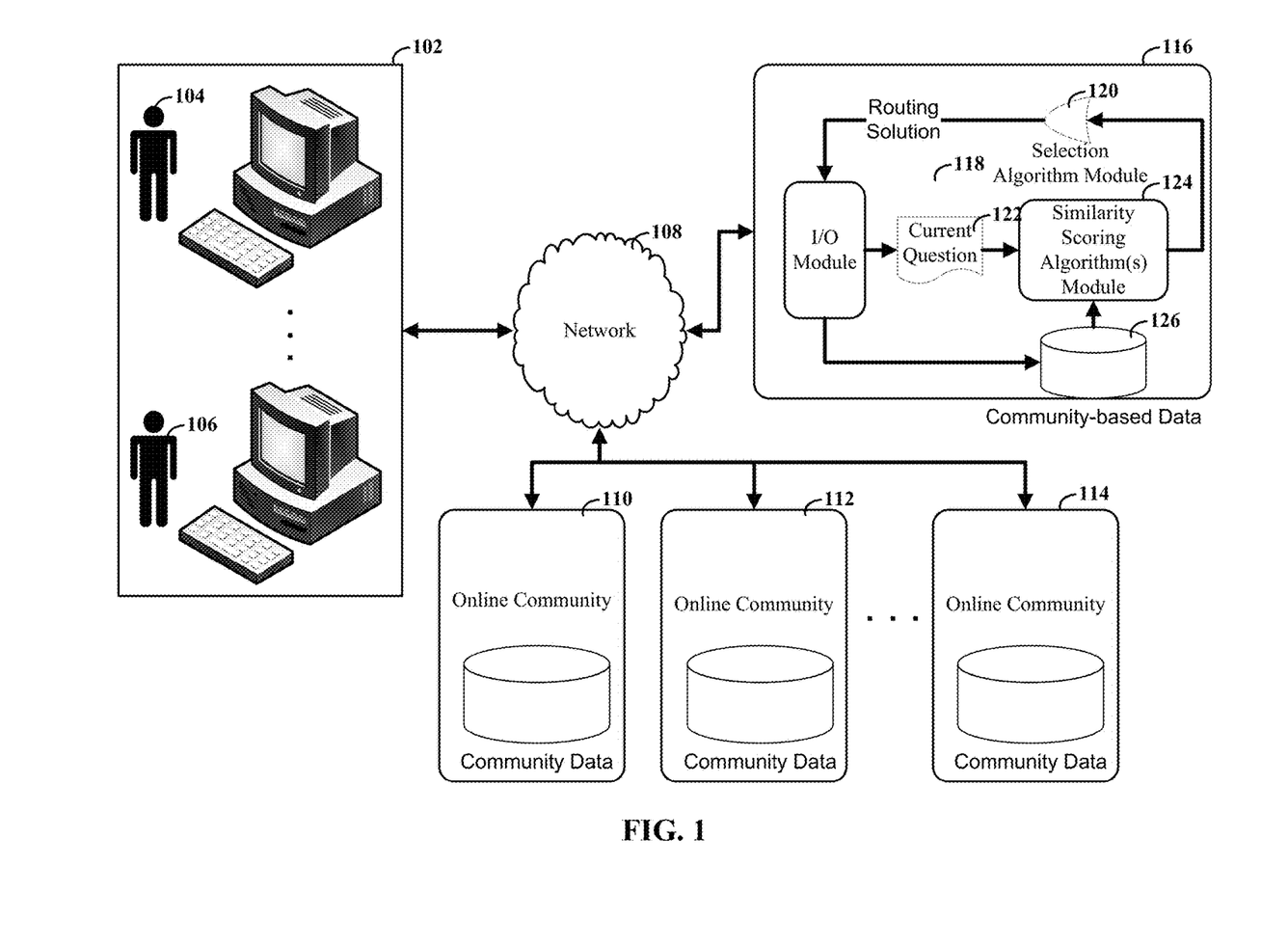
FIG. 1 depicts a system diagram for question routing to online communities, consistent with embodiments of the present disclosure.

Turning now to the figures, FIG. 1 depicts a system diagram for question routing to online communities, consistent with embodiments of the present disclosure. There can be any number of users 102 (104, 106) that access online communities 110, 112, 114 and their corresponding data. Consistent with certain embodiments, the online communities can be online forums, blogs or other formats that allow individuals (users 102) to both ask questions and provide answers using network 108 (e.g., the Internet or a local LAN). The community data of communities 110, 112, 114 can include past questions and answers as well as identification of users that contributed to the questions and answers. The community data can also include information such as time and date of the contributions from users, community feedback (e.g., "ratings," "likes" or "thanks" from other users), and other information.

When a user 102 has a current question 122 for submission to the online communities 110, 112, 114, it can be difficult to identify which online community to submit the question. Accordingly, embodiments of the present disclosure are directed toward a question to community matching system 116. The current question 122 can be received by an input/output (I/O) module 118. Community-based data 126 can then be used by a similarity scoring algorithm(s) module 124 to assess similarities between community-based metrics and the current question 122.

According to certain embodiments, the community-based data 126 can be retrieved from the various online communities 110, 112, 114 over the network 108. For instance, the online communities may include one or more web pages that the system 116 can retrieve data from by, for example, performing data scraping of the web pages. In some embodiments, the system 116 may have more direct access to the community data for the online communities 110, 112, 114. For instance, a large enterprise may host one or more internal community platforms that allow individuals of the enterprise to collaborate by sharing knowledge and assisting one another. The enterprise can also host the community matching system 116.

As discussed herein, the similarity scoring algorithm(s) module 124 can use a plurality of community-based metrics to determine a similarity value between the communities 110, 112, 114 and the asked question. In certain embodiments the determined similarity values can be expressed as a community score for the asked question versus the associated metric(s). For instance, the metrics can be used to determine matches between the asked question and: past/existing questions of the communities (question-to-question similarity), active users of the communities (question-to-user similarity) and/or community norms (question-to-community similarity).

A selection algorithm 120 can then be used to determine a question routing solution that identifies one or more communities for the current question 122. Embodiments of the present disclosure are directed toward the use of a machine learning algorithm to assist in the selection process. Consistent with certain embodiments, the selection algorithm 120 can use a nearest neighbor algorithm that ranks the communities based upon the similarity scores and filters out communities based upon this ranking. Other selection or filter algorithms are also possible.

The question can then be routed to the selected communities. In certain embodiments, the question can be automatically routed and the asking user can be notified of location(s) that their question was routed so that they can monitor for subsequent responses or answers. In some embodiments, the asking user can be presented with the selected communities so that the user can confirm which, if any, of the selected communities should be used to ask the question. In some instances, the user can choose not to use any of the selected communities and may choose instead to manually select a community.

Consistent with certain embodiments, the asking user can be presented with selection options that can help steer the question to the appropriate community. For instance, the asking user can be presented with general fields (e.g., computers, health care, parenting or automotive care) that can be selected to identify the subject matter of the asked question. The system 116 can use such user-provided information to filter out certain communities from the analysis and scoring.

Figure 2:
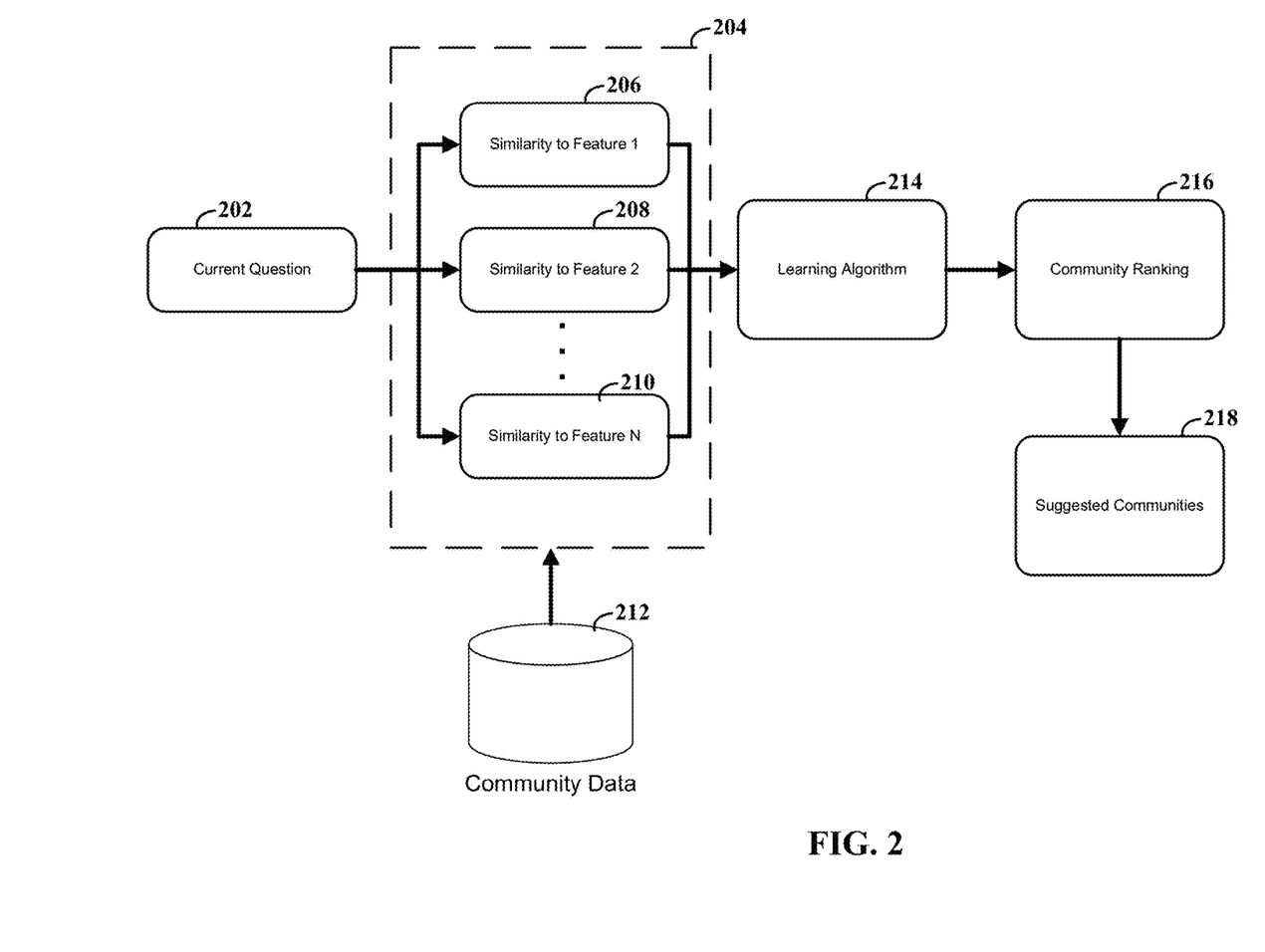
FIG. 2 depicts a flow diagram for selecting online communities that match a question, consistent with embodiments of the present disclosure.

FIG. 2 depicts a flow diagram for selecting online communities that match a question, consistent with embodiments of the present disclosure. When a current question 202 is received, it can be compared to one or more community-based features 206, 208, 210 to determine the similarity between the features and the question. The community-based features can be extracted from the community data 212, which can represent the content of the various online communities. This content can include questions and answers posted by various users that make up the online communities. A learning algorithm 214 (e.g., nearest neighbor) can then be used to generate a community ranking 216. The top one or more ranked communities can then be identified and provided as suggested communities 218, to which the asked question can be routed.

As discussed in more detail herein, the features 206, 208, 210 can be associated with a particular entity. These entities can include, but are not necessarily limited to, the question (which can include the routed question and the existing questions asked in the communities), the user (which can include the question asker and the community members) and community (which can include the various communities where the interactions between the users occur). Each of these entities can have one or more features, some of which are expressly discussed in more detail herein.

Aspects of the present disclosure recognize that question routing to communities, as opposed to individual users or groups of users, can be particularly useful for accounting for community based factors, such as user membership and their intra-community dynamics. Question routing in which items (such as games, movies or restaurants) are recommended to a group of users instead of a single user is often limited by commonalities between the group members (e.g., the recommended item appeals to all group members). As a result, min, max, or mean based aggregation can be adequate solutions. Consistent with embodiments of the present disclosure question routing is accomplished by considering the fact that most of the community members are information seekers and not active contributors, so a community profile based on all its members may be ineffectual.

Question classification may aim at putting the question into several semantic categories by building a category profile based on the prior categorized questions. Often these categories are orthogonal and they do not share topical similarities. Aspects of the present disclosure are based upon the recognition that communities may not follow such constraints, e.g., communities can compete with one another in a topic space. Additionally, the notion of user membership and their intra-community dynamics may not be present during question categorization, but can be useful for question routing.

According to certain embodiments, a question can be separated into a summary title and an optional description. These two fields can be combined to create a question document (QD). Based on QD, several different features can be extracted. A few examples of features (Q1-Q6) are listed in Table 1. The features listed in this, and other, tables herein are not limiting and additional features can be considered and/or the listed features can be subdivided in to multiple separately considered features.

TABLE 1

| ID | Feature |
| --- | --- |
| Q1 | Number of views |
| Q2 | Number of unique answerers |
| Q3 | Did asker answer the question |
| Q4 | Word vector (normalized using Tf-Idf) |
| Q5 | Topic distribution (LDA, LSA, etc.) |
| Q6 | Language analysis (e.g. typos, negative/positive emotions, greetings, nouns, pronouns, etc.) |

The Q1 feature represents the number of times that the particular question was viewed by users of the community. The Q2 feature represents the number of individual or unique user-answerers for the particular question. The Q3 feature represents wither or not the asker of the question answered the question themselves (e.g., figured out the answer elsewhere). Each of features Q1-Q3 is based upon properties of questions that already exist in the online communities, and therefore, they are each unlikely to apply to the asked question.

Q4 represents a word vector or vector space model, which can use term frequency-inverse document frequency (Tf-Idf). The questions' topic distribution (Q5) can be another feature. Certain embodiments are directed to the use of the Latent Dirichlet Allocation (LDA) topic modeling algorithm. For instance, QDs within a community can be combined to create a community document CD. Then, LDA is run over CDs and once it estimates the topic-word proportions, the topic distribution of an individual question is inferred. A topic model can be run over CDs instead of QDs directly because this may lead to a more reliable estimation of topics due to two possible factors: a) there are fewer communities (hundreds to thousands) in comparison to questions (tens or hundreds of thousands), and, b) CD are wordy (~7000 words) whereas QD are terse (~100 words). These factors can result in CD being robust to noise and reliable for topic estimation.

The language analysis (Q6) can be carried out using a computerized text analysis. A particular, non-limiting example is the Linguistic Inquiry and Word count (LIWC) tool. LIWC can provide scores on a number (80-90) of features for the input text. A few features include: a) usage of negative (and positive) words, b) usage of singular pronouns, c) usage of bad words, d) usage of greetings, and e) usage of special characters (e.g., @, #, ?, !, etc). Another component of language analysis can be the presence or absence of spelling mistakes. This analysis can be made using one or more dictionaries (English words+Technical jargon) and a Jaro-Winkler similarity measure. The language analysis can be used to test whether an asked question adheres to the community norms (e.g. censorship of some communities towards bad words, excessive personalization of a post, acceptance of particular languages, poor readability of a post due to lots of spelling or grammar mistakes, short message service (text/SMS) language, or special characters). The use of other question features is also possible.

Table 2 shows a list of a few examples of user features.

TABLE 2

| ID | Feature |
| --- | --- |
| U1 | Demographics of user (job, department, location) |
| U2 | Communities that user created or owns |
| U3 | Communities which contain user as a member |
| U4 | Topical expertise of the user |
| U5 | Availability of the user |
| U6 | Inclination to respond to a given user |
| U7 | Language analysis of the answered questions |

The user features can include various types of demographic information (U1) for a user. This can include, but is not limited to, work experience, education and/or location. The user features can also include the communities which the user has created, owns or has moderation privileges (U2). Another similar feature can be the communities to which a user is at least a member.

Consistent with certain embodiments, a users' topical expertise (U4), can be determined using a variant of a z-score expertise modeled as $$\frac{a-q}{\sqrt{a+q}},$$

where "a" is the number of answers given by the user and q is the number of questions asked by the user. This scheme of estimating expertise can often function as well or better than other models like PageRank and HITS, while remaining relatively simple to calculate. To estimate the topical expertise the system can consider topical z-score as follows:

$$z(t) = \frac{a(t) - q(t)}{\sqrt{a(t) + q(t)}},$$

where t is a topic, a(t) indicates the sum of topic t's component for all the questions answered by the user, and similarly q(t) represents the sum of topic t's component of all the questions asked by the user. Note that, topical z-score is a generalization of z-score, as the z-score can be retrieved by setting the number of topics to 1.

User availability (U5) can be relevant for find the most appropriate answerers to a question while reducing the expected waiting time of the asker. One measurement of availability is to assess the activity patterns of the users to detect the amount of activity they perform per login session. A similar probabilistic model can include the examination of the most recent two weeks' hourly activity of the users and the assignment of a probability proportional to the frequency of activity per hour. This helps to account for a tendency of some users to be active for a short period of time followed by a long period of passiveness; hence examining recent two weeks may provide a more accurate estimation of their current activity levels. Alternative and more complex analyses are also possible.

Figure 3:
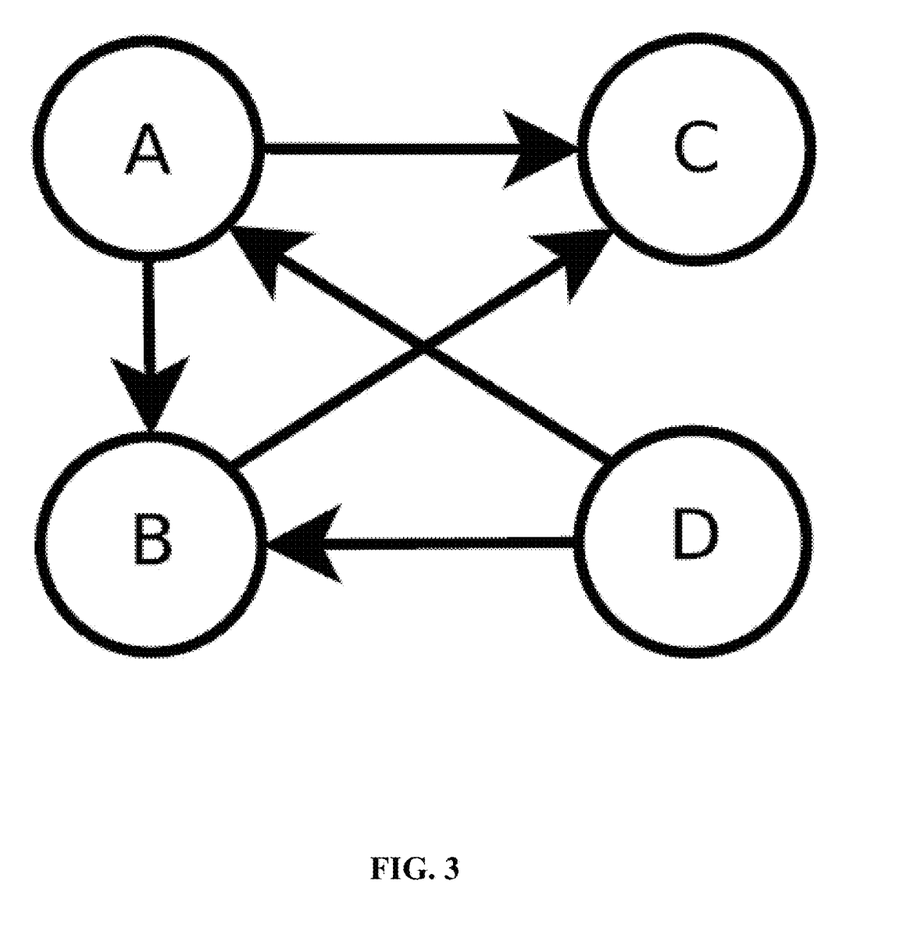
FIG. 3 depicts a question-answer (QA) graph between users, consistent with embodiments of the present disclosure.

FIG. 3 depicts a question-answer (QA) graph between users, consistent with embodiments of the present disclosure. A particular user feature can be the likelihood, or inclination, that a particular user will respond to an asking user (U6). Consistent with various embodiments, this likelihood can be computed based on the strength of the shortest path between the two users in a QA graph, such as the graph depicted in FIG. 3. The QA graph is a directed and weighted graph that is generated by connecting the question asker (x) to the answerer (y). The edge weight can indicate the number of questions of x answered by y. FIG. 3 shows an example of a QA graph, where C has answered A's question, A has answered D's question and so on. In certain embodiments, the inclination to respond can be calculated as the minimum weight on the shortest directed path from the asker to potential answerer. If no path exists then inclination can be set to a predetermined value (e.g., 0:5). A hypothesis behind this manner of determination for this feature is that if a user u has replied to another user v in the past or if u connects to v with a high strength directed path, then u might be more likely to reply to v in the future as well. Justifications for this hypothesis include that u and v share similar topical interest, share similar views and/or they are familiar with one another.

Another feature can include a language analysis (U7) of the asked question, a few examples of which are discussed in more detail herein.

Table 3 presents a list of community features.

TABLE 3

| ID | Feature |
| --- | --- |
| C1 | Word vector of community title and description |
| C2 | Topical distribution of the community |
| C3 | Topical expertise of the community members |
| C4 | Availability of the community members |
| C5 | Inclination to respond to a user |
| C6 | Language analysis |

According to certain embodiments, the community features can include a word vector (C1) or vector space model, which can use term frequency-inverse document frequency (Tf-Idf). Consistent with various embodiments, a community feature is the topical distribution (C2), which can be computed using LDA over community documents (CDs). A third feature (C3) can be the community expertise, availability, inclination, and language analysis, which can be computed in a similar fashion as discussed for individual users by aggregating all the activity within the community. Note that this is a naive way of computing the community features, in which the semantics of users is ignored. As discussed herein, it is also possible to use algorithms to aggregate the community measures through the features of users and questions within a community.

Consistent with embodiments, the features presented in Table 1, 2, and 3 can be combined in order to construct one or more similarity metrics. These metrics can computed from the perspective of a routed question q. For instance, to compute the similarity of q with the existing questions in the communities, the system can use Kullback-Leibler divergence (KL) between the topic distributions Q5, $$KL_{x||y} = \sum_i x_i * \log\left(\frac{x_i}{y_i}\right)$$

where $x_i$ and $y_i$ are the ith component of the probability distribution x, y. Low KL value indicates high similarity and high KL value indicates low similarity. Topic similarity $KL_{Q5_q||Q5_{q'}}$ can be used to route q to the communities where similar questions were asked. Moreover, another factor can be incorporated: how well those questions were answered. If those questions were not properly answered, then it might be counter-intuitive to route q to their communities. To incorporate this factor, the notion of question value Val(p) can be used. One manner to estimate or determine this value is to use the number of people who viewed the question and the number of unique users who answered it.

Val(p)=$Q1_p$·log(1+$Q2_p$-$Q3_p$)

In this manner, an unanswered question has a value 0. A question that received 5 answers from 2 distinct users has lower value (5 log 3) than a question that received 4 answers from 3 distinct users (4 log 4). Val can estimate of the relative interest of the community towards answering a question. The topic match between the routed question q and an existing question q' can then be defined as:

q-topic(q, q')=Val(q')·$KL_{Q5_q||Q5_{q'}}$

Consistent with embodiments, the system can compute the match between the language features of the two questions.

q-lang(q, q')=Val(q')·Cosine(Q6, $Q6_{q'}$)

where $$Cosine(a, b) = \frac{a^T b}{||a||_2 ||b||_2}$$

is the cosine similarity between two vectors a and b. Consistent with various embodiments, cosine similarity can be used instead of KL because language features need not be probability distributions.

Similar to question to question similarity metrics, user question similarity metrics can be computed. Consistent with certain embodiments, the familiarity of the potential answerers (u) with the question asker (v) can first be computed. For instance, this factor can computed based on a hypothesis that users who share a lot of communities, have similar demographics, or have interacted with one-another previously will be more familiar with one another. Familiarity of the two users can thereby be defined as follows.

$$F(v, u) = \log\left\{\begin{array}{l} 1 + U6(v, u) + \alpha J(U1_v, U1_u) + \\ \beta J(U2_v, U2_u) + \gamma J(U3_v, U3_u) \end{array}\right\}$$

where α, β, γ are weight parameters and J $$J(a, b) = \frac{|a \cap b|}{|a \cup b|}$$

is the Jaccard index between two sets a and b. The motivation behind F is that the higher the familiarity, the higher the chances of answering. Various embodiments relate to the consideration of three metrics for finding potential answerers.

u-exprt(q, u)=F(v, u)·$KL_{Q5_q||U4_u}$ where u-exprt estimates the topical expertise match of the user to the routed question.

u-lang(q, u)=F(v, u)·Cosine($Q6_q$, $U7_u$)

where u-lang estimates the language match between the question answered by u0 previously and the routed question.

u-avail(q, u)=F(v, u)·U5(q, u)

where u-avail estimates the availability of the user around the time of the post of the question. The intuition behind multiplication of the metrics with familiarity is that the algorithms might then prefer moderate experts who are familiar to the asker in comparison to a top expert who doesn't know the asker at all. Note that a log scaling was used in the familiarity term (F(v, u)) to ensure that it doesn't dominate the three metrics.

Question to community similarity metrics can be also computed. For instance, the system can estimate the topical match of q with a community c using the topic distribution of the question and the community. Additionally, a community can contain a brief description supplied by its owners. This description could be useful as it might hold clues to the topical interest of the community. In certain embodiments, these two factors to compute topical similarity as follows:

c-topic(q, c)=$KL_{Q5_q||C2_c}$-δ·Cosine($Q4_q$, $C1_c$)

where δ is the relative importance of community description over KL match. Now (similar to u-exprt) the system can compute the expertise of the community towards answering q as follows:

c-exprt(q, c)=$KL_{Q5_q||C3_c}$

In a similar fashion, the system can compute the c-lang and c-avail. Note that that c-* metrics (where "*" represents a wildcard) can be computed by considering all the activity within a community, ignoring the users who produced that activity.

Consistent with certain embodiments, the determined similarity metrics can be used by one or more algorithms to generate a ranked list of communities for the asked question. For instance, the algorithms can include two nearest neighbor (knn) algorithms that compute community scores from various similarity metrics, such as the similarity metrics discussed herein. Note that c-* similarity metrics already represent community scores, so the two algorithms are useful for computing community scores from the q-* and u-* metrics. The intuition behind the knn algorithms is that aggregations based on min, max, and mean may not capture the true score of a community, e.g., due to the skew in activity levels of the community members. The two algorithms can take as input the following parameters: number of recommendations n to produce, number of nearest neighbors k, a question q, a set of objects O, a set of communities C which contain the objects in O, and a similarity metric M between q and the objects in the set O.

The first algorithm (Algorithm 1) represents a Global-knn algorithm to rank communities. The algorithm can picks k objects with the largest similarity M(q, o). The score of each community can then be computed based on how many of each community's objects appear in the top k list $O^*_k$. Then n communities with the highest community scores are returned. Algorithm 1 can be express as follows:

---
Algorithm 1 Global-knn(k,n,q,O,C,$\mathcal{M}$)
---

Require: $\mathcal{M}$: q × O → R is a similarity metric.
1: Sort o ∈ O in decreasing order of their $\mathcal{M}$(q,o). Let the sorted list be $\{o_{i_1}, o_{i_2}, \ldots\}$, s.t., $\mathcal{M}(q, o_{i_a}) \geq \mathcal{M}(q, o_{i_b})$ for all $i_a < i_b$.
2: Pick top k objects, $O_k^* = \{o_{i_1}, \ldots, o_{i_k}\}$.
3: Compute community score $CS_G(c)$ based on the number of objects in $O_k^*$ that belong to the community c.
   $CS_G(c) = |\{o : o \in O_k^* \wedge o \in c\}|$
4: Return top n communites based on their $CS_G$ score.

---

In step 3, vote of each object can be the same (=1) irrespective of their position in the top k list or their similarity score M.

Algorithm 2 presents Local-knn algorithm. Unlike the previous approach, it first picks top k objects per community based on their similarity with the routed question q. The average similarity of the top k objects constitute that community's score and the top n communities with the highest $CS_L$ are recommended. Algorithm 2 can be express as follows:

---
Algorithm 2 Local-knn (k, n, q, O, C, $\mathcal{M}$)
---

Require: $\mathcal{M}$: q × O → $\mathbb{R}$ is a similarity metric.
1: Let O (c) = {o : ∀ o ∈ O ∧ o ∈ c} be the set of objects that belong to a community c.
2: Sort objects in O (c) in decreasing order of their M (q, o) score. Let the sorted list be $\{o_{i_1}, o_{i_2}, \ldots\}$, s.t., $M(q, o_{i_a}) \geq M(q, o_{i_b})$ for all $i_a < i_b$.
3: Pick top k objects, $O_k^*(c) = \{o_{i_1}, \ldots, o_{i_k}\}$ and compute the community score $CS_L(c)$ as follows:

$$CS_L(c) = \frac{1}{|O_k^*(c)|} \sum_{o \in O_k^*(c)} \mathcal{M}(q, o)$$

4: Return top n communities based on their $CS_L$ score.

---

Consistent with certain embodiments, the system could adjust the algorithm to account for potential biased towards communities with a number of objects less than k. For instance, consider two communities $c_1$ and $c_2$ with $k_1$ and $k_2$ objects, respectively. Consider also where $k_1 < k_s < k_1 < k_2$. If the nearest neighbor parameter k is varied from $k_s$ to $k_1$, then in worst case, Local-knn algorithm does not reduce the score of $c_1$, but reduces the score of $c_2$ by a factor of $k_s$.

Accordingly, a community with a large number of objects can be relatively less preferable for large k. Consistent with certain embodiments, this can be compensated for by normalizing the community scores as: $\overline{CS}_L(c) = CS_L(c) * \log\{|O^*_k(c)|\}$. Log-based normalization ensures that the communities with small number of objects are penalized by a factor of $(\log k_1)/(\log k)$. This penalization can thereby mitigate the effect of the algorithm's bias. Without the use the log function, the result may be to create a bias towards larger communities.

Using the two knn algorithms, the system can generate several scores for a community, each score corresponding to a similarity metric. Let $\vec{f}_{c,q}$ represent all such scores of a community c for a routed question q. $\vec{f}$ can then be used to rank communities.

Consistent with particular embodiments, three mechanisms can be used to rank communities.

A first mechanism is to use linear regression for ranking. The system can first construct a binary response variable (y) which is set to 1 for the desired community and 0 for the non-desired ones. Then optimal weights $w_{lr}$ can be estimated using the linear regression framework. The closed form solution is $w_{lr} = (F^T F)^{-1} F^T Y$, where $F = [\vec{f}_{c_1,q}, \vec{f}_{c_2,q} \ldots]^T$ is the design matrix and $Y = [y_{c_1,q}, y_{c_2,q} \ldots]^T$ is the output response. The weight vector $w_{lr}$ indicates the relative importance of different community scores in estimating the desirability of communities. For final ranking, the system can sort communities in decreasing order of their $w_{lr}^T \cdot \vec{f}_{c,q}$ value.

A second mechanism is to generate a ranked list per score type and then merge those ranked lists. The general version of this problem is NP-hard but there are several greedy algorithms. Certain embodiments can use a Borda count algorithm. The Borda count algorithm computes the aggregate rank of a community and sorts then on their aggregate rank. Various embodiments can use a weighted version of the algorithm, in which weighted aggregate rank is computed. The particular weighting can be determined using various methods, whether automated, manual or a combination thereof. For instance, in order to automatically learn the weights, an iterative reweighing scheme can be used in which the weight of one ranked list is estimated by fixing the weights of other ranked lists. The weights can be adjusted in order to minimize the rank of desired communities. This process can be repeated a set number of iterations, until the weights have sufficiently converged to a final value and so on.

A third mechanism is to cast it as a convex optimization problem with pair wise constraints. For instance, the system can use ranking using a support vector machine (SVM) algorithm. SVMs can be based on the concept of decision planes that define decision boundaries. A decision plane is a hyperplane that separates between a set of objects having different class memberships. The hyperplane can be selected by increasing (or maximizing) margins for an SVM trained with samples from two classes. Samples on the margin are sometimes referred to as the support vectors. More particularly, the system can let $R_q$ and $S_q$ be the set of desired and non-desired communities for a question q. Then the optimal weights $w_{svm}$ are obtained through the following minimization, $$\text{minimize } \frac{1}{2} w^T w + \lambda \sum \xi_{a,b,q}$$

subject to:

$$\forall q, \forall a \in R_q, \forall b \in S_q: w^T(\vec{f}_{a,q} - \vec{f}_{b,q}) > 1 - \xi_{a,b,q}$$

$$\forall q, \forall a \in R_q, \forall b \in S_q: \xi_{a,b,q} \geq 0$$

For final ranking, the system can sort communities in decreasing order of their $w_{svm}^T \cdot \vec{f}_{c,q}$ value.

Various embodiments provide mechanisms that consider the efficiencies of running the question routing algorithms. For instance, the run time complexity of the local and global knn algorithms is O(|Q|+|U|+|C|) as the algorithms cycle through all the questions, users, and communities. This can be expensive for a large dataset and hinder its applicability in a real time system or otherwise. Accordingly and consistent with certain embodiments, the system can cluster the communities into 1 different clusters. For instance, the system can compute the community-community affinity by computing their topic similarity ($KL_{C2_{c1}||C2_{c2}}$) and then running a spectral clustering algorithm using the normalized cut criteria. For routing a question, the system can pick the most topically appropriate cluster and run the recommendation algorithms for the communities within that cluster. This strategy leads to a reduction in the time complexity that can be up to a factor of 1.

Various embodiments are directed toward the ability to select and/or weight various metrics. For instance, experimental testing suggests that similarity metrics q-topic and u-exprt can often perform significantly better than other similarity metrics across various the conditions. Moreover, experimental testing has also suggested that certain metrics may work better for different types of online communities. As a non-limiting example, u-exprt may be better for the certain types of enterprise datasets while q-topic may be better for publically accessible datasets, such as online medical question answering communities.

Certain embodiments are directed toward the ability to select and/or weight various community ranking algorithms. For instance, experimental data has suggested that the local-knn algorithm may perform better than the global-knn algorithm. This would suggest that the computation of community scores based on top users/questions with in a community can be more effective than first picking top users/questions globally and then computing the community scores through a voting mechanism.

Embodiments of the present disclosure also consider aggregation of similarity with or without consideration of other factors. For instance, Similarity metrics c-*, which were computed by aggregating all activity within a community naively without considering semantics of users and questions, may perform worse than their q-* and u-* counterparts. This suggests that in certain instances a naive merging of all the activity may be less effective than a mechanism that distinguishes activity based on who produced it.

Various embodiments allow for the consideration of factors such as the number of topics. For instance, a relevant parameters required by LDA is the number of topics. The precision of the local-knn algorithm for several choices of number of topics suggested that an increase in the number topics can lead to an increase in the performance. It is believed that a small value of the number topics leads to under-fitting in the topic space, which in turn leads to increase in false positives. On the other hand, a large value of #topics could lead to over-fitting, which in turn might eliminate desirable communities from the candidate set. Additionally, a large number of topics can lead to more iterations of the LDA algorithm before convergence.

Embodiments allow for various alternate topic representation schemes. For instance, Tf-Idf based and vector space model (VSM) schemes can be used. These schemes can also be sensitive to the choice of topic model and the number of topics.

Consistent with embodiments, the number of neighbors (k) for the nearest neighbor algorithms can be selected based on the various factors. For instance, as k is increased from small values the score of a topically relevant community with a lot of similar questions can increase in the global-knn algorithm. However, as k becomes large the performance may degrade as the algorithm becomes biased towards communities with a lot of questions irrespective of their similarity. A similar performance trend can occur for the local-knn algorithm; however, as k is increased the algorithm may become biased towards communities with fewer questions. This bias towards smaller communities is exacerbated as k is increased further. To solve this problem, a system can be configured to multiply the community scores with log(min{k, #object). Accordingly, a choice of k can play a role in the performance of the algorithms.

Various embodiments are directed toward combining the two nearest neighbor algorithms in a pipeline fashion. The system can be configured to get n recommendations by running the first (global or local) algorithm to get recommendations, filtering the set of communities based on the recommendations, and then running the second (the other of global or local) algorithm over the altered set of communities to get n recommendations. Experimental data suggests that pipelining can lead to a boost in the performance of the models in comparison to their individual performance. It is believed that this improvement may be the result of the first algorithm filtering out noisy communities, which leads to a robust ranking by the second algorithm.

The results show that apart from topical interest and expertise, language features such as usage of technical terms, personalization, friendliness, negative sentiments, etc., can also provide a boost of in the predictive power of the models. The precise balance between the different features can depend upon variables such as the routed question and the underlying dataset.

Figure 4:
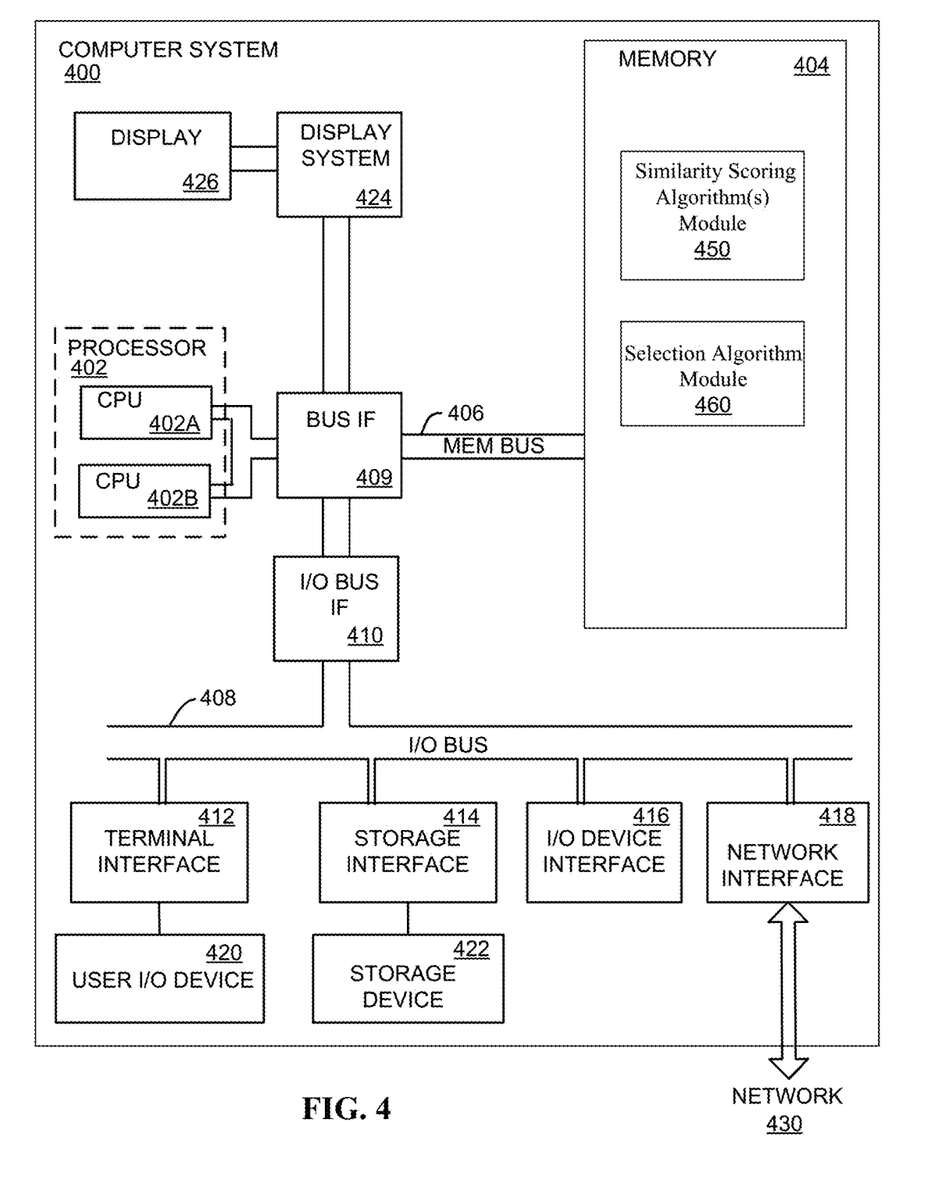
FIG. 4 depicts a block diagram of a computer system for implementing various embodiments.

FIG. 4 depicts a block diagram of a computer system for implementing various embodiments. The mechanisms and apparatus of the various embodiments disclosed herein apply equally to any appropriate computing system. The major components of the computer system 400 include one or more processors 402, a memory 404, a terminal interface 412, a storage interface 414, an I/O (Input/Output) device interface 416, and a network interface 418, all of which are communicatively coupled, directly or indirectly, for inter-component communication via a memory bus 406, an I/O bus 408, bus interface unit 409, and an I/O bus interface unit 410.

The computer system 400 may contain one or more general-purpose programmable central processing units (CPUs) 402A and 402B, herein generically referred to as the processor 402. In embodiments, the computer system 400 may contain multiple processors; however, in certain embodiments, the computer system 400 may alternatively be a single CPU system. Each processor 402 executes instructions stored in the memory 404 and may include one or more levels of on-board cache.

In embodiments, the memory 404 may include a random-access semiconductor memory, storage device, and/or storage medium (either volatile or non-volatile) for storing and/or encoding data and programs. In certain embodiments, the memory 404 represents the entire virtual memory of the computer system 400, and may also include the virtual memory of other computer systems coupled to the computer system 400 or connected via a network. The memory 404 can be conceptually viewed as a single monolithic entity, but in other embodiments the memory 404 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 404 may store all or a portion of the various programs, modules and data structures for processing data transfers as discussed herein. For instance, the memory 404 can store a similarity scoring tool or module 450 and/or community selection tool or module 460. Consistent with certain embodiments, these tools can be implemented as part of one or more database systems. These programs and data structures are illustrated as being included within the memory 404 in the computer system 400, however, in other embodiments, some or all of them may be on different computer systems and may be accessed remotely, e.g., via a network. The computer system 400 may use virtual addressing mechanisms that allow the programs of the computer system 400 to behave as if they only have access to a large, single storage entity instead of access to multiple, smaller storage entities. Thus, while the similarity scoring 450 and the community selection tool 460 are illustrated as being included within the memory 404, these components are not necessarily all completely contained in the same storage device at the same time. Further, although the similarity scoring tool 450 and the community selection tool 460 are illustrated as being separate entities, in other embodiments some of them, portions of some of them, or all of them may be packaged together (e.g., as part of the same monitor thread).

In embodiments, the similarity scoring tool 450 and the community selection tool 460 may include instructions or statements that execute on the processor 402 or instructions or statements that are interpreted by instructions or statements that execute on the processor 402 to carry out the functions as further described below. In certain embodiments, the similarity scoring tool 450 and the community selection tool 460 can be implemented in hardware via semiconductor devices, chips, logical gates, circuits, circuit cards, and/or other physical hardware devices in lieu of, or in addition to, a processor-based system. In embodiments, the similarity scoring tool 450 and community selection tool 460 may include data in addition to instructions or statements.

The computer system 400 may include a bus interface unit 409 to handle communications among the processor 402, the memory 404, a display system 424, and the I/O bus interface unit 410. The I/O bus interface unit 410 may be coupled with the I/O bus 408 for transferring data to and from the various I/O units. The I/O bus interface unit 410 communicates with multiple I/O interface units 412, 414, 416, and 418, which are also known as I/O processors (IOPs) or I/O adapters (IOAs), through the I/O bus 408. The display system 424 may include a display controller, a display memory, or both. The display controller may provide video, audio, or both types of data to a display device 426. The display memory may be a dedicated memory for buffering video data. The display system 424 may be coupled with a display device 426, such as a standalone display screen, computer monitor, television, or a tablet or handheld device display. In one embodiment, the display device 426 may include one or more speakers for rendering audio. Alternatively, one or more speakers for rendering audio may be coupled with an I/O interface unit. In alternate embodiments, one or more of the functions provided by the display system 424 may be on board an integrated circuit that also includes the processor 402. In addition, one or more of the functions provided by the bus interface unit 409 may be on board an integrated circuit that also includes the processor 402.

The I/O interface units support communication with a variety of storage and I/O devices. For example, the terminal interface unit 412 supports the attachment of one or more user I/O devices 420, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 420 and the computer system 400, and may receive output data via the user output devices. For example, a user interface may be presented via the user I/O device 420, such as displayed on a display device, played via a speaker, or printed via a printer.

The storage interface 414 supports the attachment of one or more disk drives or direct access storage devices 422 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 422 may be implemented via any type of secondary storage device. The contents of the memory 404, or any portion thereof, may be stored to and retrieved from the storage device 422 as needed. The I/O device interface 416 provides an interface to any of various other I/O devices or devices of other types, such as printers or fax machines. The network interface 418 provides one or more communication paths from the computer system 400 to other digital devices and computer systems; these communication paths may include, e.g., one or more networks 430.

Although the computer system 400 shown in FIG. 4 illustrates a particular bus structure providing a direct communication path among the processors 402, the memory 404, the bus interface 409, the display system 424, and the I/O bus interface unit 410, in alternative embodiments the computer system 400 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 410 and the I/O bus 408 are shown as single respective units, the computer system 400 may, in fact, contain multiple I/O bus interface units 410 and/or multiple I/O buses 408. While multiple I/O interface units are shown, which separate the I/O bus 408 from various communications paths running to the various I/O devices, in other embodiments, some or all of the I/O devices are connected directly to one or more system I/O buses.

In various embodiments, the computer system 400 is a multi-user mainframe computer system, a single-user system, or a server computer or similar device that has little or no direct user interface, but receives requests from other computer systems (clients). In other embodiments, the computer system 400 may be implemented as a desktop computer, portable computer, laptop or notebook computer, tablet computer, pocket computer, telephone, smart phone, or any other suitable type of electronic device.

FIG. 4 depicts a representative of certain major components of the computer system 400. Individual components, however, may have greater complexity than represented in FIG. 4, components other than or in addition to those shown in FIG. 4 may be present, and the number, type, and configuration of such components may vary. Several particular examples of additional complexity or additional variations are disclosed herein; these are by way of example only and are not necessarily the only such variations. The various program components illustrated in FIG. 4 may be implemented, in various embodiments, in a number of different manners, including using various computer applications, routines, components, programs, objects, modules, data structures, etc., which may be referred to herein as "software," "computer programs," or simply "programs."

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although the present disclosure has been described in terms of specific embodiments, it is anticipated that alterations and modifications thereof will become apparent to those skilled in the art. Therefore, it is intended that the following claims be interpreted as covering all such alterations and modifications as fall within the true spirit and scope of the disclosure.

What is claimed is:

1. A system comprising:
a computing device having a processor; and
a computer readable storage medium having program instructions embodied therewith, the program instructions readable/executable by the processor to cause the system to perform a method, the method comprising:
determining, for a current question presented by an asking user and for a plurality of existing questions within a plurality of online communities that each has a plurality of users contributing answers to the plurality of existing questions, a plurality of question-to-question similarity values;
determining, for the current question presented by the asking user and of the plurality of users contributing answers, a plurality of question-to-user similarity values, the question-to-user similarity values includes scoring the question-to-user similarity based at least on determining how many communities one or more of the plurality of users are members of;
determining, for the current question presented by the asking user and the plurality of online communities, a plurality of question-to-community similarity values;
selecting one or more of the plurality of online communities based on the plurality of question-to-question similarity values, the plurality of question-to-user similarity values and the plurality of question-to-community similarity values; and
routing the current question presented by the asking user to the selected one or more of the plurality of online communities.

2. The system of claim 1, wherein selecting one or more of the plurality of online communities includes:
ranking, for the plurality of online communities, a plurality of similarity values that include the question-to-question similarity values and at least one of the group consisting of the question-to-user similarity values and the question-to-community similarity values;
identifying, based on the ranking, a subset of similarity values from the plurality of similarity values;
scoring online communities of the plurality of online communities based on how many similarity values in the subset correspond to a particular online community being scored; and
wherein the selecting one or more of the plurality of online communities is responsive to the scoring of the online communities.

3. The system of claim 1, wherein the question-to-question similarity values include values determined from at least one factor selected from the group consisting of: how many user views for an existing question in a corresponding online community, how many unique user answered the existing question, whether or not another asking user answered the existing question, a word vector of the existing question, topic distribution for the existing question and a language analysis existing question in a corresponding online community.

4. The system of claim 1, wherein the question-to-user similarity values include values determined from at least one factor selected from the group consisting of: demographics users, communities that a user has created, communities that users are members, a topical expertise of the user, an availability of the user, an inclination of another user to respond to the asking user, and a language analysis of answered questions in the plurality of online communities.

5. The system of claim 1, wherein the question-to-community similarity values include values determined from at least one factor selected from the group consisting of: a word vector of a community title and description; a topical distribution of a community, a topical expertise of community members, an availability of community members, an inclination of community members to respond to the asking user and a language analysis of community data content.

6. The system of claim 2, the method further comprising:
determining similarity values for the plurality of online communities; and
partitioning, based upon the similarity values, the plurality of online communities into clusters of online communities, the clusters of online communities corresponding to different websites; and
wherein ranking, for the online communities, the question-to-question similarity values is carried out on a per cluster basis.

7. The system of claim 1, wherein determining a plurality of question-to-user similarity values includes the use of a question answer (QA) graph that specifies which users have answer questions for other users.

8. The system of claim 7, wherein the QA graph is weighted according to how many questions each user has answered for other users.

9. The system of claim 1, wherein the question-to-user similarity values include values determined from a topical expertise of the user that is calculated based upon how many questions were answered and asked by a user and for a particular topic.

10. A computer-implemented method comprising:
determining, for a current question presented by an asking user and a plurality of existing questions within a plurality of online communities, a plurality of similarity values for each of the plurality of online communities, the determining a plurality of similarity values including determining how well one or more questions of the plurality of existing questions are answered, the one or more questions being similar to the current question;
ranking the plurality of similarity values;
selecting, based on the ranking, a subset of similarity values from the plurality of similarity values;
scoring the online communities of the plurality of online communities based on how many similarity values in the subset that correspond to a particular online community being scored;
selecting one or more of the plurality of online communities based on the scoring; and
routing the current question presented by the asking user to the selected one or more of the plurality of online communities.

11. The method of claim 10, wherein determining a plurality of similarity values for each of the plurality of online communities includes determining for the current question presented by the asking user and the plurality of existing questions within the plurality of online communities, a plurality of question-to-question similarity values.

12. The method of claim 10, wherein determining a plurality of similarity values for each of the plurality of online communities includes determining, for the current question presented by the asking user and of a plurality of users contributing answers to questions, a plurality of question-to-user similarity values.

13. The method of claim 10, wherein determining a plurality of similarity values for each of the plurality of online communities includes determining, for the current question presented by the asking user and the plurality of online communities, a plurality of question-to-community similarity values.

14. The method of claim 10, wherein selecting a subset of similarity values from the plurality of similarity values includes comparing similarity values from the plurality of similarity values globally across the plurality of online communities.

15. The method of claim 10, wherein selecting a subset of similarity values from the plurality of similarity values includes comparing similarity values from the plurality of similarity values locally for communities of the plurality of online communities.

16. The method of claim 15, wherein selecting a subset of similarity values from the plurality of similarity values further includes comparing similarity values from the plurality of similarity values globally across the plurality of online communities.

17. A computer program product for routing questions, the computer program product comprising a non-transitory computer readable storage medium having program code embodied therewith, the program code readable/executable by a computer to:

determine, using the computer and for a current question presented by an asking user and for a plurality of existing questions within a plurality of online communities that each has a plurality of users contributing answers to the plurality of existing questions, a plurality of question-to-question similarity values;

determine, using the computer and for the current question presented by the asking user and of the plurality of users contributing answers, a plurality of question-to-user similarity values;

determine, using the computer and for the current question presented by the asking user and the plurality of online communities, a plurality of question-to-community similarity values, the plurality of question-to-community similarity values including values determined from a word vector of a community title and description using term frequency-inverse document frequency (Tf-Idf);

select, using the computer, one or more of the plurality of online communities based on the plurality of question-to-question similarity values, the plurality of question-to-user similarity values and plurality of question-to-community similarity values; and route, using the computer, the current question presented by the asking user to the selected one or more of the plurality of online communities.

* * * * *